(12) United States Patent
Mitsuma et al.

(10) Patent No.: US 11,712,827 B2
(45) Date of Patent: Aug. 1, 2023

(54) MOLDING MACHINE MANAGEMENT SYSTEM

(71) Applicant: Seiko Epson Corporation, Tokyo (JP)

(72) Inventors: Yusuke Mitsuma, Shiojiri (JP); Yoshiaki Otsuki, Matsumoto (JP); Ko Tsukada, Matsumoto (JP)

(73) Assignee: SEIKO EPSON CORPORATION

( * ) Notice: Subject to any disclaimer, the term of this patent is extended or adjusted under 35 U.S.C. 154(b) by 0 days.

(21) Appl. No.: 17/527,318

(22) Filed: Nov. 16, 2021

(65) Prior Publication Data

US 2022/0152894 A1   May 19, 2022

(30) Foreign Application Priority Data

Nov. 17, 2020   (JP) ................................. 2020-190968

(51) Int. Cl.
*B29C 45/17*   (2006.01)
*B29C 45/76*   (2006.01)
*G05B 19/4155*   (2006.01)

(52) U.S. Cl.
CPC .......... *B29C 45/1774* (2013.01); *B29C 45/76* (2013.01); *G05B 19/4155* (2013.01); *B29C 2045/7606* (2013.01); *G05B 2219/45244* (2013.01)

(58) Field of Classification Search
None
See application file for complete search history.

(56) References Cited

U.S. PATENT DOCUMENTS

| 2004/0044434 A1* | 3/2004 | Morimura | ............... B29C 45/76 700/197 |
| 2008/0184114 A1* | 7/2008 | Hano | ...................... B29C 45/76 715/700 |

FOREIGN PATENT DOCUMENTS

JP   2001-293761 A   10/2001

* cited by examiner

*Primary Examiner* — Ryan A Jarrett
(74) *Attorney, Agent, or Firm* — Harness, Dickey & Pierce, P.L.C.

(57) ABSTRACT

Provided is a molding machine management system that manages production of a plurality of molding machines, including: a display unit configured to display a production performance and a planned production status in association with a time axis for each molding machine, and, when the molding machine management system receives an abnormality of a molding machine, to display the abnormality of the molding machine in association with the time axis for each molding machine. The molding machine management system configured as described above can appropriately manage each molding machine.

5 Claims, 3 Drawing Sheets

MOLDING MACHINE MANAGEMENT SYSTEM

The present application is based on, and claims priority from JP Application Serial Number 2020-190968, filed Nov. 17, 2020, the disclosure of which is hereby incorporated by reference herein in its entirety.

BACKGROUND

1. Technical Field

The present disclosure relates to a molding machine management system.

2. Related Art

In the related art, molding machine management systems that manage production of molding machines have been used. For example, JP-A-2001-293761 (PTL 1) discloses a monitoring device capable of managing production of an injection molding machine. The monitoring device in PTL 1 displays abnormality occurrence information in a band shape on a line graph representing an operation status of the injection molding machine based on shot number data.

The molding machine management system may manage production of a plurality of molding machines. When the molding machine management system manages production of a plurality of molding machines, it is preferable that not only the production management of all the plurality of molding machines but also the production management of each molding machine can be performed. This is because, when an abnormality occurs, it is possible to appropriately cope with each molding machine, and it is possible to increase the overall production efficiency.

However, the monitoring device in PTL 1 is intended to identify a cause of the occurrence of the abnormality, and only displays an abnormality occurrence time point and a time width thereof as abnormality occurrence information. Therefore, for example, it is not possible to distinguish between a case where an abnormality occurs in a plurality of molding machines and a case where an abnormality occurs in one molding machine. Thus, in the molding machine management system in the related art such as the monitoring device in PTL 1, it is difficult to appropriately manage each molding machine in the case of managing production of a plurality of molding machines.

SUMMARY

A molding machine management system according to the present disclosure for solving the problem manages production of a plurality of molding machines, and includes: a display unit configured to display a production performance and a planned production status in association with a time axis for each molding machine, and, when the molding machine management system receives an abnormality of a molding machine, to display the abnormality of the molding machine in association with the time axis for each molding machine.

DESCRIPTION OF EXEMPLARY EMBODIMENTS

Figure 1:
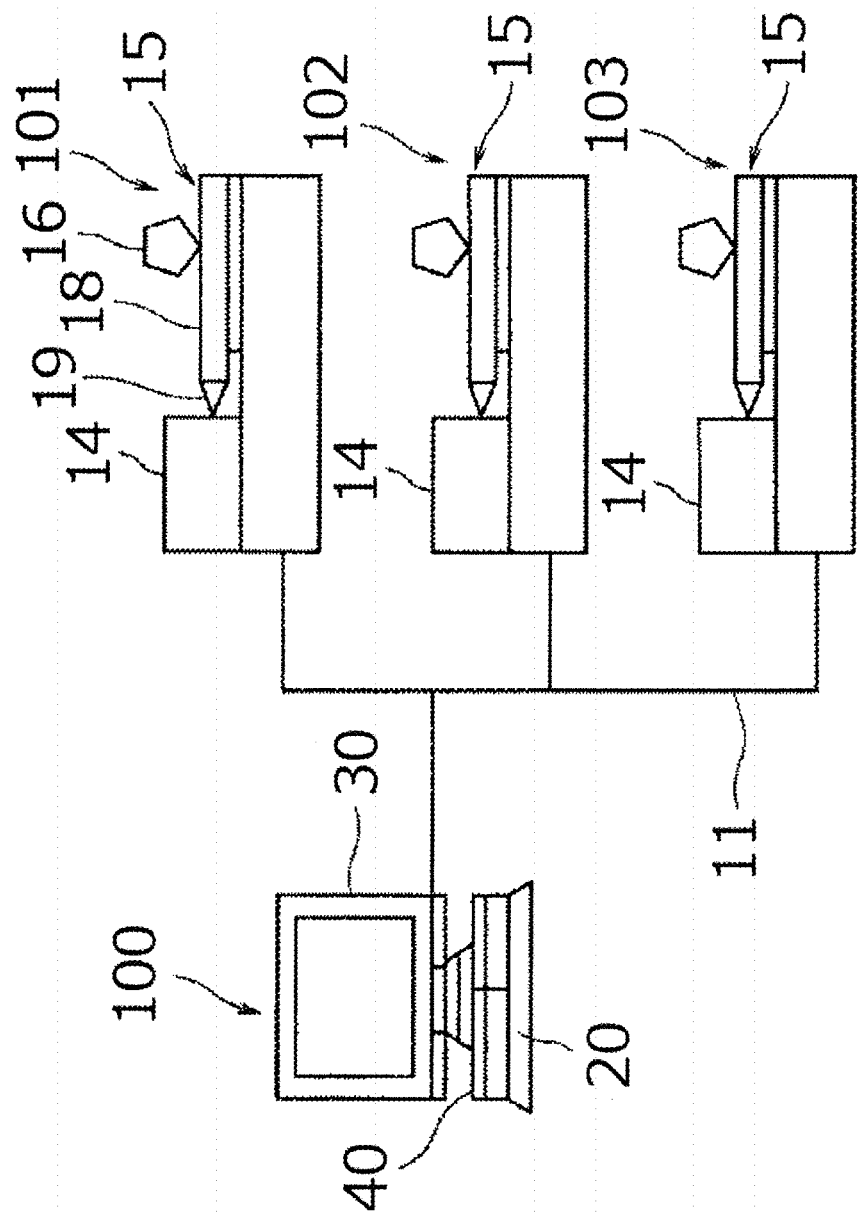
FIG. 1 is a diagram showing a schematic configuration of an injection molding machine management system according to an embodiment of the present disclosure.

First, the present disclosure will be briefly described.

A molding machine management system according to a first aspect of the present disclosure for solving the problem manages production of a plurality of molding machines, and includes: a display unit configured to display a production performance and a planned production status in association with a time axis for each molding machine, and, when the molding machine management system receives an abnormality of a molding machine, to display the abnormality of the molding machine in association with the time axis for each molding machine.

According to this aspect, the production performance and the planned production status are displayed in association with the time axis for each molding machine, and the abnormality of the molding machine is displayed in association with the time axis for each molding machine when the abnormality of the molding machine is received. Therefore, when the abnormality occurs in the molding machine, the operator can easily recognize the molding machine and the time zone where the abnormality has occurred. In particular, since it is possible to recognize the molding machine and the time zone where the abnormality has occurred in consideration of the production performance and the planned production status, it is possible to perform a subsequent action particularly appropriately. Therefore, it is possible to appropriately manage each molding machine among a plurality of molding machines.

The molding machine management system according to a second aspect of the present disclosure is directed to the first aspect, in which the display unit displays the abnormality of the molding machine by using an icon.

According to this aspect, the abnormality of the molding machine is displayed by using an icon. Therefore, when an abnormality occurs in the molding machine, the operator can easily recognize the abnormality of the molding machine at a glance.

The molding machine management system according to a third aspect of the present disclosure is directed to the second aspect, in which the display unit displays the icon in a different manner according to a content of the abnormality of the molding machine.

According to this aspect, icons are displayed differently in accordance with the content of the abnormality of the molding machine. Therefore, for example, by using different icons depending on the number of occurrences of the abnormality or the like, for example, when the degree of abnormality is severe and a plurality of abnormalities occur in one molding machine, the operator can easily recognize this situation. For example, the operator can easily recognize the content of the abnormality by using different icons depending on the content of the abnormality. Therefore, the operator can take appropriate measures in accordance with a scale of the abnormality and a priority.

The molding machine management system according to a fourth aspect of the present disclosure is directed to the second aspect, in which the display unit displays the icon in a different manner according to a progress status of the abnormality of the molding machine.

According to this aspect, icons are displayed differently in accordance with the progress status of the abnormality of the molding machine. Therefore, the operator can easily recognize the current state of the molding machine in which the abnormality has occurred. The operator can easily recognize the current state of the molding machine in which the abnormality has occurred, by using different icons depending on, for example, a state in which the operation for removing the cause of the abnormality is being performed, a state in which the cause of the abnormality is removed and the molding of the molded product can be restarted, and a state in which the cause of the abnormality is removed and the molding of the molded product is being restarted, as compared with the state in which the molding machine in which the abnormality has occurred is in an abnormality-occurred state.

The molding machine management system according to a fifth aspect of the present disclosure is directed to any one of the first to fourth aspects, in which the display unit displays the abnormality of the molding machine when the molding machine management system receives at least one of a defect determination result of a molded product by the molding machine and a change exceeding a threshold value of a molding condition of the molding machine.

According to this aspect, the molding machine management system displays the abnormality of the molding machine when the molding machine management system receives at least one of the defect determination result of the molded product by the molding machine and the change exceeding the threshold value of the molding condition of the molding machine. A defect number can be accurately recognized based on the defect determination result of the molded product, and the abnormality of the molding machine can be recognized based on the change exceeding the threshold value of the molding condition of the molding machine.

The molding machine management system according to a sixth aspect of the present disclosure is directed to any one of the first to fifth aspects, in which the display unit displays, as the production performance, an operation of the molding machine, a stop of the molding machine, an operation preparation state of the molding machine, and a planned production end time corresponding to the production performance up to a current time in association with the time axis for each molding machine.

According to this aspect, the operation of the molding machine, the stop of the molding machine, the operation preparation state of the molding machine, and the planned production end time corresponding to the production performance at the current time are displayed as the production performance in association with the time axis for each molding machine. Therefore, the operator can recognize the production performance of each molding machine in detail.

Hereinafter, an embodiment of the present disclosure will be described with reference to the accompanying drawings. First, a schematic configuration of an injection molding machine management system according to an embodiment of the present disclosure will be described with reference to FIG. 1. The injection molding machine management system according to the present embodiment includes a molding machine 101, a molding machine 102, and a molding machine 103 as a plurality of injection molding machines, and a molding machine management system 100 that manages production of the plurality of injection molding machines. Each injection molding machine and the molding machine management system 100 are electrically coupled to each other via a wiring 11. However, each injection molding machine and the molding machine management system 100 may be wirelessly and electrically coupled to each other via a wireless LAN or the like.

Here, the molding machine 101, the molding machine 102, and the molding machine 103 have a similar configuration. Although the injection molding machine management system according to the present embodiment includes three injection molding machines, the number of injection molding machines may be two or four or more.

As shown in FIG. 1, each of the molding machine 101, the molding machine 102, and the molding machine 103 includes a control unit 14 and an injection device 15. The injection device 15 includes a heating cylinder 18 that heats and melts a resin as a molding material (not shown) supplied from a hopper 16, and an injection nozzle 19 that injects the molten resin. In the heating cylinder 18, a screw (not shown) is disposed so as to be movable forward and backward and rotatable.

The injection device 15 includes a metering motor (not shown) and an injection motor (not shown). When the screw is rotated by driving the metering motor, a predetermined amount of molten resin is accumulated in front of the screw in the heating cylinder 18, and when the screw is moved forward by driving the injection motor, the resin accumulated in front is injected and filled in a cavity space of a mold device in a mold clamped state. When the resin in the cavity space is cooled to form a molded product and the mold is opened, by driving a projecting motor as a driving unit for projecting an ejector device (not shown), an ejector pin is moved forward, and the molded product is projected and released from the mold.

As shown in FIG. 1, the molding machine management system 100 includes a user interface 20 that receives various pieces of information inputs by an operator, a display unit 30, and a control unit 40. Hereinafter, the configuration of the molding machine management system 100 will be described in more detail with reference to FIG. 2. Although the molding machine management system 100 according to the present embodiment is provided independently of the injection molding machine, the molding machine management system 100 does not need to be provided independently of the injection molding machine. The present disclosure can also be achieved by using, as a molding machine management system, a control device (not shown) including the control unit 14, and a user interface and a display unit, which are originally provided in at least one of the molding machine 101, the molding machine 102, and the molding machine 103.

Figure 2:
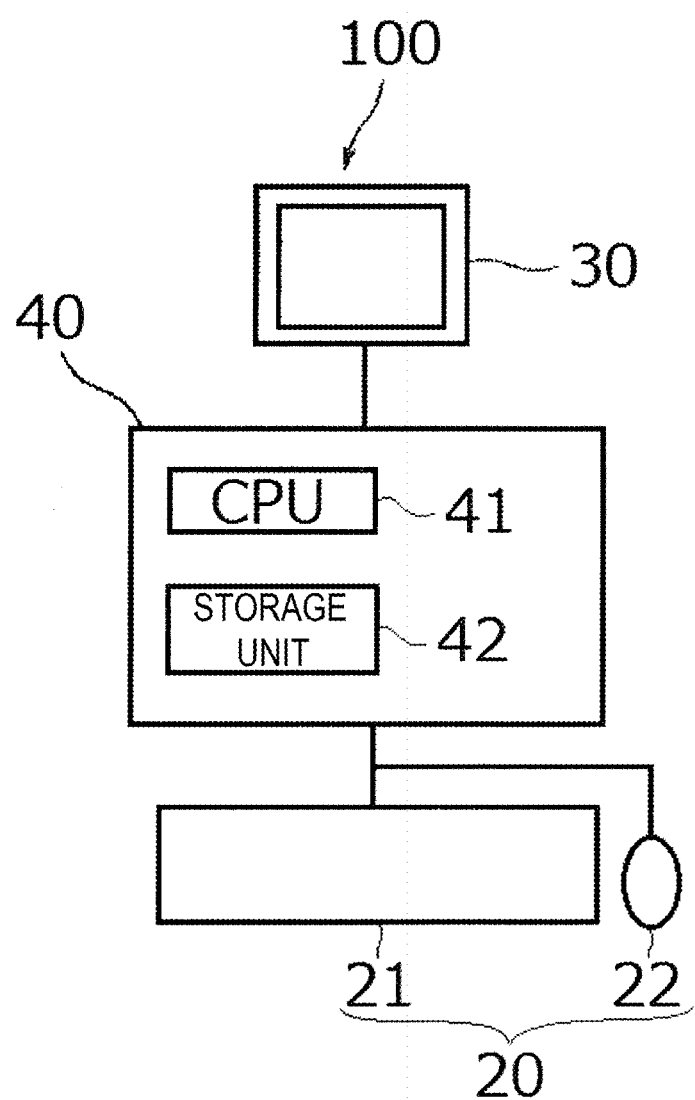
FIG. 2 is a diagram showing a schematic configuration of a molding machine management system in the injection molding machine management system in FIG. 1.

As shown in FIG. 2, the user interface 20 includes a keyboard 21, a mouse 22, and the like. However, the present disclosure is not limited to such a configuration, and the user interface 20 may be implemented by a touch panel or the like together with the display unit 30.

As shown in FIG. 2, the control unit 40 includes a CPU 41 and a storage unit 42. The storage unit 42 includes, a hard disk, a RAM and the like, and receives data such as pressure, temperature, and speed, which are data for data logging obtained for each shot in molding, setting change history data obtained when the molding condition is changed, abnormality occurrence history data obtained when an abnormality occurs and is detected, and shot number data, and stores the above data for a predetermined time in the past, here, for 24 hours or more. The data for data logging includes data obtained from various sensors installed in the injection molding machine for logging, for example, a resin pressure sensor in a mold, a position sensor for a screw, or a speed sensor of each motor. Since this type of data logging is performed by any injection molding machine, a detailed description thereof will be omitted.

The CPU 41 processes the various types of data read from the storage unit 42, and causes the display unit 30 to display an overall operation status of the molding machine 101, the molding machine 102, and the molding machine 103, the operation status of a production line, and the detailed operation status of the molding machines on a multi-screen on a common time axis such that the above operation status can be seen at a glance. Hereinafter, a specific display example in the display unit 30 will be described in detail with reference to FIG. 3. Here, in the present embodiment, the molding machine 101 corresponds to the molding machine 1 in FIG. 3, the molding machine 102 corresponds to the molding machine 2 in FIG. 3, and the molding machine 103 corresponds to the molding machine 3 in FIG. 3. The molding machine 101 and the molding machine 102 form a production line 1, and the molding machine 103 independently forms a production line 2. As numerical values in FIG. 3, numerical values different from those in actual cases may be displayed in order to explain the present disclosure in an easy-to-understand manner.

Figure 3:
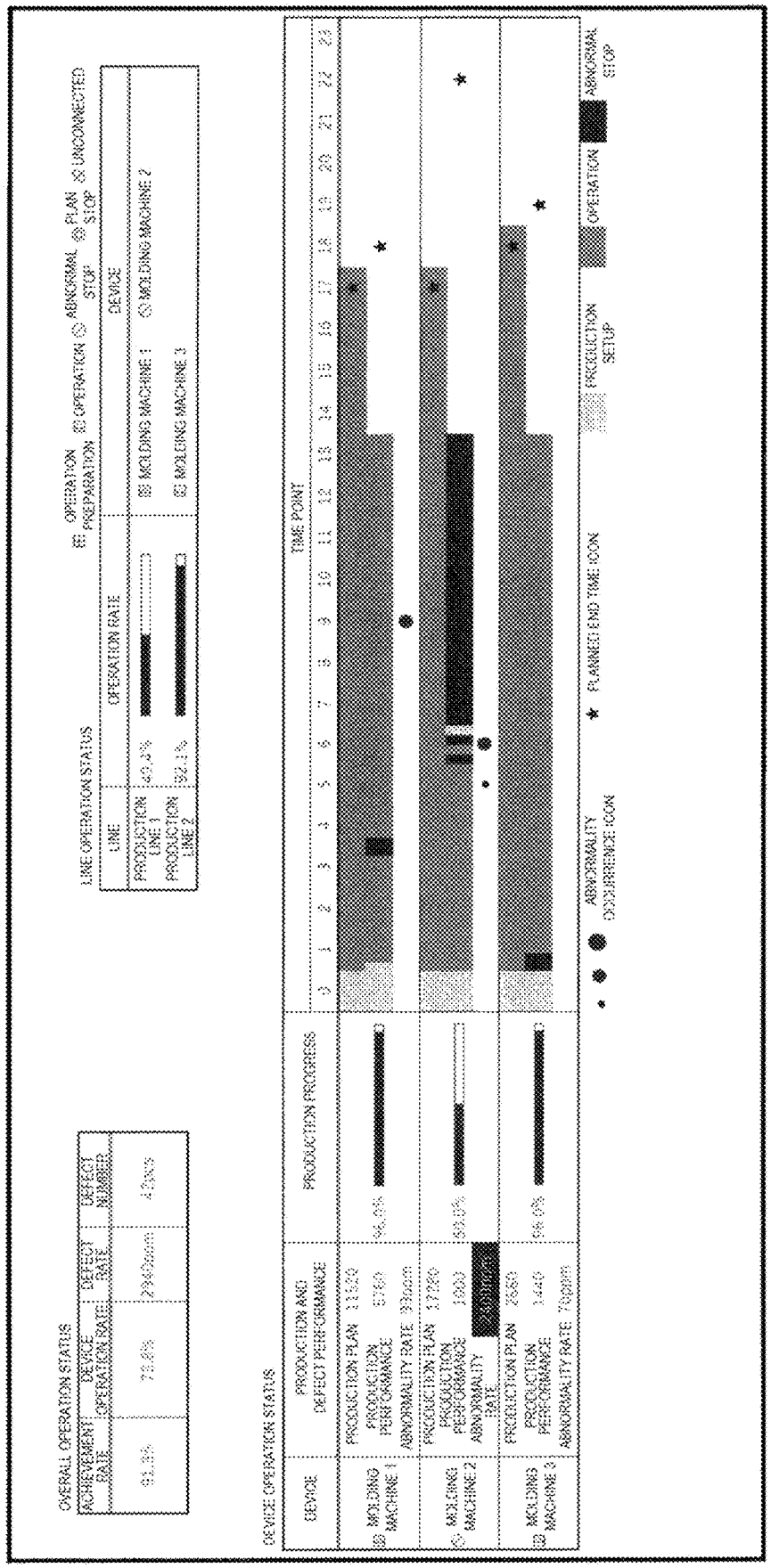
FIG. 3 is a display example of the molding machine management system in FIG. 2.

As shown in an upper left part of the display unit in FIG. 3, the molding machine management system 100 according to the present embodiment displays the overall operation status of the molding machine 101, the molding machine 102, and the molding machine 103. A display content includes an achievement rate at a current time point with respect to the planned production number at the current time point, a device operation rate of the entire injection molding machine during a period from the start of production to the current time point, a defect rate of the molded product produced so far, and the defect number of the molded product produced so far. The achievement rate and the device operation rate are expressed in percentage, the defect rate is expressed in ppm (parts per million), and the defect number is expressed in number. However, the way of expressing the above is not limited to the way of expressing in the present embodiment.

As shown in an upper right part of the display unit in FIG. 3, the molding machine management system 100 according to the present embodiment displays the operation status for each production line. The display content indicates, for each production line, an actual operation rate during a period from the start of the production to the current time point with respect to the planned operation rate during a period from the start of production to the current time point, and a current state of the injection molding machine forming the production line. It is shown that the operation rate of the production line 1 including the molding machine 101 and the molding machine 102 is about 50%, the operation rate of the production line 2 including the molding machine 103 is 90% or more, the molding machine 101 and the molding machine 103 are currently in operation, and the molding machine 102 is currently stopped due to an abnormality.

As shown in a lower part of the display unit 30 in FIG. 3, the molding machine management system 100 according to the present embodiment displays a detailed operation status for each molding machine. The display content shows, the current state of each injection molding machine, a production and defect performance in each injection molding machine, a production progress in each injection molding machine, and a production plan in association with the time axis from 0:00 a.m. to 12:00 p.m. (24:00) and an operation status up to the current time point in each injection molding machine. FIG. 3 shows an example of a case where the current time period is between 13:00 and 14:00.

Here, among the detailed operation states of the respective molding machines shown in the lower part of the display unit 30 in FIG. 3, the production and defect performance in respective injection molding machines will be described in detail. In the display of the production and defect performance, for each molding machine, the planned number of molded products as a production plan, the number of the produced molded products up to the current time point as a production performance, and the number of the molded products subjected to defect determination with respect to the total number of the molded products produced up to the current time point as a defect rate are displayed in ppm.

Next, among the detailed operation status of the respective molding machines shown in the lower part of the display unit 30 in FIG. 3, the production plan in association with the time axis from 0:00 a.m. to 12:00 p.m. and the operation status up to the current time point in each injection molding machine will be described in detail. The production plan and the production performance up to the current time point are displayed in a bar graph in association with the time axis. In the bar graph, light gray represents a production setup period corresponding to preparation for operating the injection molding machine, dark gray represents an operation period of the injection molding machine, and black represents a period in which an abnormality occurs in the injection molding machine and the operation of the injection molding machine is stopped. From the bar graph, a transition of the production performance up to the current time point with respect to the production plan can be recognized at a glance. A star icon is an icon representing a planned end time, and the star icon on a production performance side moves in accordance with the production performance. Although the display unit 30 displays the time axis in a period from 0:00 a.m. to 12:00 p.m., when the period from the start of production to the end of production is 24 hours or longer, the period of the time axis displayed on the display unit 30 can be determined to any period. For example, when the start of production is 9:00 a.m. on the day and the end of production is 11:00 a.m. on the next day, the display unit 30 may display the time axis in a period from 0:00 a.m. on the day to 0:00 p.m. on the next day.

On a lower side of the bar graph, a display space of an abnormality occurrence icon displayed when an abnormality occurs in the injection molding machine is provided in association with the time axis. The abnormality occurrence icon can display circular icons in three sizes according to a degree of abnormality occurrence. For example, when the number of abnormalities occurring in the molded product is less than a first threshold value, a circular icon is not displayed, when the number of abnormalities occurring in the molded product is equal to or greater than the first threshold value and less than a second threshold value, a small circular icon can be displayed, when the number of abnormalities occurring in the molded product is equal to or greater than the second threshold value and less than a third threshold value, a medium circular icon can be displayed, and when the number of abnormalities occurring in the molded product is equal to or greater than the third threshold value, a large circular icon can be displayed. FIG. 3 shows a case where an abnormality that the number of abnormalities occurring in the molded product is equal to or greater than the second threshold value and less than the third threshold value occurs in the molding machine 101 between 9:00 and 10:00, an abnormality that the number of abnormalities occurring in the molded product is equal to or greater than the first threshold value and less than the second threshold value occurs in the molding machine 102 between 5:00 and 6:00, and an abnormality that the number of abnormalities occurring in the molded product is equal to or greater than the second threshold value and less than the third threshold value occurs in the molding machine 102 between 6:00 and 7:00. In the present embodiment, when a cursor is placed on the circular icon, a specific number of abnormality occurrences can be displayed.

From the bar graph in the lower part of the display unit 30 in FIG. 3, it can be seen that the molding machine 1 starts the operation about 15 minutes later than the production plan due to the production setup, and abnormally stops at about 4:00 for about 30 minutes, and when the operation continues as it is, the planned end time is between 18:00 to 19:00, which is originally between 17:00 to 18:00. From the bar graph, it can also be seen that the molding machine 2 is abnormally stopped at about 6:00, the operation and the production setup are repeated between 6:00 to 7:00, but the state in which the molding machine 2 is stopped at about 7:00 continues, and even if the operation is restarted from now on, the planned end time is between 22:00 to 23:00, which is originally between 17:00 and 18:00. From the bar graph, it can also be seen that the molding machine 3 starts the operation about 30 minutes later than the production plan due to the abnormal stop and when the operation continues as it is, the planned end time is between 19:00 and 20:00, which is originally between 18:00 and 19:00. The abnormal stop includes a case where the molding is stopped when the molding machine management system 100 receives data indicating an abnormality from each molding machine, and a case where an operator discovers an abnormality in the molding machine and stops the molding machine after manually inputting a stop command from the molding machine management system 100 or each molding machine.

As described above, the molding machine management system 100 according to the present embodiment is a molding machine management system that performs production management of a plurality of molding machines (the molding machine 101, the molding machine 102, and the molding machine 103). As shown in FIG. 3, the molding machine management system 100 according to the present embodiment includes the display unit 30 that displays in a bar graph the production performance and the planned production status for each molding machine in association with the time axis, and displays in a circular icon the abnormality of the molding machine for each molding machine in association with the time axis when the molding machine management system 100 receives the abnormality of the molding machine. The "abnormality of the molding machine" includes not only a case where the molding machine fails and does not operate, but also a case where the molding machine operates but there is an abnormality in the molded product. The "case where the abnormality of the molding machine is received" corresponds to the case where the molding machine management system 100 stops the molding machine when data indicating the abnormality is transmitted from each molding machine, and the case where the operator discovers the abnormality of the molding machine and stops the molding machine after manually inputting the stop command from the molding machine management system 100 or each molding machine, corresponding to the case where the abnormal stop is performed.

Accordingly, by displaying the production performance and the planned production status in association with the time axis for each molding machine, and the abnormality of the molding machine in association with the time axis for each molding machine when the abnormality of the molding machine is received, when an abnormality occurs in the molding machine, the operator can easily recognize the molding machine and the time zone where the abnormality has occurred. In particular, since it is possible to recognize the molding machine and the time zone where the abnormality has occurred in consideration of the production performance and the planned production status, it is possible to perform the subsequent action particularly appropriately. For example, if an abnormality occurs near the production end time, it is possible to select to change the molding to another molding machine for molding. On the other hand, if an abnormality occurs in a time zone far from the end time, it is possible to select to immediately repair the molding machine in which the abnormality has occurred and to restart the molding. Therefore, in the molding machine management system 100 according to the present embodiment, it is possible to appropriately manage each molding machine among the plurality of molding machines.

Here, as described above, the display unit 30 in the molding machine management system 100 according to the present embodiment displays the abnormality of the molding machine by using a circular icon. Therefore, when the abnormality occurs in the molding machine, the operator can easily recognize the abnormality of the molding machine at a glance. In the present embodiment, although the abnormality of the molding machine is indicated by a circular icon, the shape of the icon is not particularly limited.

As described above, the display unit 30 in the molding machine management system 100 according to the present embodiment can display icons such as a small circular icon, a medium circular icon, and a large circular icon in a different manner according to the content of the abnormality of the molding machine. Therefore, for example, by using different icons depending on the degree of abnormality, such as the number of occurrences of the abnormality, and the content of the abnormality, for example, when the degree of abnormality is severe and a plurality of abnormalities occur in one molding machine or the like, the operator can easily recognize the occurrence of the plurality of abnormalities. On the other hand, for example, different icons may be used depending on the content of the abnormality. The operator can easily recognize the content of the abnormality by using different icons depending on the content of the abnormality. Therefore, the operator can take appropriate measures in accordance with the scale of the abnormality and the priority. Examples of "displaying different icons" include changing a size of the icon as in the present embodiment, and changing a color or a shape of the icon.

Here, the display unit 30 in the molding machine management system 100 according to the present embodiment can display the icons differently according to the content of the abnormality of the molding machine as described above, and can also display the icons differently according to the progress status of the abnormality of the molding machine. Specifically, different icons can be used depending on, for example, the state in which the operation for removing the cause of the abnormality is being performed, the state in which the cause of the abnormality is removed and the molding of the molded product can be restarted, and the state in which the cause of the abnormality is removed and the molding of the molded product is being restarted, as compared with the state in which the molding machine in which the abnormality has occurred is in an abnormality-occurred state. Therefore, the operator can easily recognize the current state of the molding machine in which the abnormality has occurred.

As described above, the molding machine management system 100 according to the present embodiment can display the specific number of abnormalities occurred when the cursor is placed on the circular icon. On the other hand, when the icons are displayed differently according to the progress status of the abnormality of the molding machine, by placing the cursor on the icon, it is possible to display the planned time for removing the cause of the abnormality or the like. In this way, it is preferable to adopt a configuration in which detailed information is displayed by placing the cursor on the icon.

Here, in the display unit 30 in the molding machine management system 100 according to the present embodiment, the abnormality of the molding machine can be displayed by using the icon, when the molding machine management system 100 receives at least one of the defect determination result of the molded product by the molding machine and the change exceeding the threshold value of the molding condition of the molding machine. The defect number can be accurately recognized based on the defect determination result of the molded product, and the abnormality of the molding machine can be recognized based om the change exceeding the threshold value of the molding condition of the molding machine. The "defect determination of the molded product" may be, for example, visually determined by the operator, automatically determined in an apparatus by reading an image of the molded product using an image reading device equipped with a camera, or the like. The "change exceeding the threshold value of the molding condition of the molding machine" may be, for example, a change exceeding the threshold value of a temperature in the molding machine.

The display unit 30 in the molding machine management system 100 according to the present embodiment displays, as the production performance represented by the bar graph on the production performance side in FIG. 3, the operation of the molding machine, the stop of the molding machine, the operation preparation state of the molding machine, and the planned production end time corresponding to the production performance up to the current time point represented by the star icon on the production performance side in FIG. 3, in association with the time axis for each molding machine. Therefore, the operator can recognize the production performance of each molding machine in detail.

The display unit 30 of the present embodiment is provided in the molding machine management system 100. Alternatively, the display unit 30 may be provided in a display terminal different from the molding machine management system 100 via a network.

The present disclosure is not limited to the embodiments described above, and can be implemented in various configurations without departing from the scope of the disclosure. In order to solve some or all of problems described above, or to achieve some or all of effects described above, technical characteristics in the embodiments corresponding to the technical characteristics in each embodiment described in the summary of the disclosure can be replaced or combined as appropriate. If the technical characteristics are not described as essential in the present description, the technical characteristics can be deleted as appropriate.

What is claimed is:

1. A molding machine management system comprising:
   a plurality of molding machines, each of the plurality of molding machines performing a molding operation;
   a display configured to display the molding operation and information relating to the molding operation;
   a memory configured to store a program and data:
   a processor configured to process the program and the data so as to;
   manage the molding operation of the plurality of molding machines;
   obtain a production plan of the molding operation of each of the plurality of molding machines from the stored data;
   obtain a current status of the molding operation from each of the plurality of molding machines;
   determine whether the current status includes an abnormality of each of the plurality of molding machines;
   determine a seriousness degree of the abnormality by comparing the abnormality with a plurality of thresholds;
   display a first bar graph on the display in association with a time axis, the first bar graph corresponding to the production plan of the molding operation of each of the plurality of molding machines;
   display a second bar graph on the display in association with the time axis, the second bar graph corresponding to the current status of the molding operation of each of the plurality of molding machines, the second bar graph being located directly adjacent to the first bar graph for each of the plurality of molding machines; and
   display an abnormality icon on the display in association with the time axis, the abnormality icon corresponding to the seriousness degree of the abnormality, the abnormality icon being located adjacent to the second bar graph of a corresponding molding machine, in which the abnormality occurs or has occurred, of the plurality of molding machines.

2. The molding machine management system according to claim 1, wherein
   the processor is configured to display the abnormality icon in a different manner according to the seriousness degree of the abnormality.

3. The molding machine management system according to claim 1, wherein
   the processor is configured to display the abnormality icon in a different manner according to a progress status of the seriousness degree of the abnormality.

4. The molding machine management system according to claim 1, wherein
   the processor is configured to display the abnormality icon on the display when the at least one of a defect determination result of a molded product molded by each of the plurality of molding machines and a change exceeding a threshold value of a molding condition of each of the plurality of molding machines.

5. The molding machine management system according to claim 1, wherein
   the processor is further configured to:
   display a planned production end time and a planned operation preparation period of the molding operation in the first bar graph in association with the time axis as the production plan with respect each of the plurality of molding machines; and
   display a stop period and an actual operation preparation period of the molding operation in the second bar graph in association with the time axis as the current status with respect each of the plurality of molding machines.

* * * * *